(12) United States Patent
Mayock (10) Patent No.: US 7,467,267 B1
(45) Date of Patent: Dec. 16, 2008

(54) METHOD AND SYSTEM FOR BACKING UP OR RESTORING DATA IN REMOTE DEVICES OVER A COMMUNICATIONS NETWORK

(75) Inventor: Sean M. Mayock, Raleigh, NC (US)

(73) Assignee: Sprint Communications Company L.P., Overland Park, KS (US)

( * ) Notice: Subject to any disclaimer, the term of this patent is extended or adjusted under 35 U.S.C. 154(b) by 487 days.

(21) Appl. No.: 10/897,492

(22) Filed: Jul. 23, 2004

(51) Int. Cl.
*G06F 12/00* (2006.01)
(52) U.S. Cl. ...................... 711/162; 707/204
(58) Field of Classification Search ............ None
See application file for complete search history.

(56) References Cited

U.S. PATENT DOCUMENTS

| | | | | |
|---|---|---|---|---|
| 5,644,768 A | * | 7/1997 | Periwal et al. | 718/102 |
| 6,144,999 A | * | 11/2000 | Khalidi et al. | 709/219 |
| 6,748,445 B1 | * | 6/2004 | Darcy et al. | 709/237 |
| 7,305,077 B2 | * | 12/2007 | Takae et al. | 379/201.12 |
| 2002/0133530 A1 | * | 9/2002 | Koning | 709/102 |
| 2002/0151302 A1 | * | 10/2002 | Schmidt et al. | 455/426 |
| 2003/0074378 A1 | * | 4/2003 | Midgley et al. | 707/204 |

\* cited by examiner

*Primary Examiner*—Reginald G Bragdon
*Assistant Examiner*—Thanh D Vo (57) ABSTRACT

Methods and media are provided for backing up data stored in one or more network-communications devices that are located in a geographic area distinct from where the backup data is to be stored. System threads for performing interactive processing to initiate an automatic scheduling procedure and job queue using a producer thread, a trending thread for retrieving and monitoring system performance factors, a foreman thread for monitoring the system performance factors for determining when an assignment is performed, one or more worker threads capable of remotely extracting backup data from network equipment, determining and recording informational logs regarding a performed backup, and sending informational traps to a surveillance manager.

18 Claims, 8 Drawing Sheets

| ID | VER | SYSTEM TYPE | NEXT RUN | IP ADDRESS | LOGIN NAME | LOGIN PASSWORD | FILES TO BACKUP | BACKUP FORMAT | TIME STAMP |
|---|---|---|---|---|---|---|---|---|---|
| ~ | ~ | ~ | ~ | ~ | ~ | ~ | ~ | ~ | ~ |
| 146 | 1.02 | NORTEL SWITCH | 10:30PM 06112004 | 172.175.124.072 | SERV2733 | LINE999229 | *.BCK, *.MIN | *.ZIP | 10:30PM 06102004 |
| ~ | ~ | ~ | ~ | ~ | ~ | ~ | ~ | ~ | ~ |
| ~ | ~ | ~ | ~ | ~ | ~ | ~ | ~ | ~ | ~ |

METHOD AND SYSTEM FOR BACKING UP OR RESTORING DATA IN REMOTE DEVICES OVER A COMMUNICATIONS NETWORK

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention generally relates to the backup and restoration of data over a communications network. More particularly, the present invention relates to the automation of remotely backing up data stored in communications network equipment.

BACKGROUND OF THE INVENTION

Performing manual, on-site backup and restoration procedures in a communications network has become common practice for many communication and telecommunication providers. One of the major problems that communication providers face when providing service to a large customer base is maintaining good backup procedures related to backing up data stored in network equipment devices. The need for backing up data plays an important role in ensuring that a communications network will be able to recover from various degrees of failure or outages.

In some communications networks, equipment is remotely located on a customer's premises to provide services such as data, voice, video and wireless services functionality. Deploying customer premise equipment on a customers facility allows a carrier to meet the needs of the customer more efficiently. One of the problems associated with locating customer premise equipment remotely from the carrier's facility is an inability to efficiently obtain and maintain backup data from the network equipment.

As a network system continues to grow, its administrators must add network equipment devices to satisfy the additional demand. When a provider continues to add new equipment to the network, such as new customer premise equipment in remote facilities, the need to gather and keep reliable backups of the data stored in the devices increases. Currently, a great amount of manpower is used to perform backup and restoration services to various network components. Performing backup and restorations on customer premise equipment requires timely resources of not only manpower but expensive backup equipment and media as well.

Performing backup and restorations on customer premise equipment has historically required resources beyond not only manpower but expensive backup equipment and media as well. In many cases, technicians must travel to a device of interest and then perform a backup by using a laptop computer or other computing device to locally link to the specific network device to be backed up. If a provider's network is distributed over vast geographic regions, such as across many cities throughout the country (each of which contain a litany of customer premise equipment), the providing backup services becomes an increasingly difficult challenge.

Another issue that providers must address is attempting to communicate with a myriad of different proprietary networking components. Due to the technical complexity of network systems, providers must often combine various network components of differing manufacturers to provide resources that customers desire. Exemplary tasks that are made more difficult by virtue of the mere presence of a large number of devices in a network include tracking, maintaining, and complying with respective procedures that are to be followed to carry out various tasks and routines to extract and restore device data. Not only are the utilities different for each, but the method for extracting the information and data requires considerable time and effort for completing the backup.

Still another illustrative problem with the current state of the art related to performing backups and restores on customer premise equipment is the inability to perform backups on one or more of the network devices. For example, consider a network that includes proprietary equipment that comprises switches, reach-line cards, inter-trunk gateway cards, and a server located at the customers site running from a particular vendor. An illustrative vendor is Nortel Networks Corporation of Brampton, Ontario. Nortel's "OTM software" lacks the ability to backup system-configuration and other data from devices, such as reach-line cards and inter-trunk gateway cards. To extract and perform backups for network devices, a user would physically have to be located at the device and link to the equipment using a laptop computer to manually download the system-configuration data from the particular network device.

Poor maintenance and usage of backup media also presents a problem with backing up data in CPE devices. Dealing with hundreds or thousands of backup devices would require potentially unreasonable recordkeeping to maintain and track the media used to backup data. Technicians are commonly responsible for maintaining a collection of physical, removable backup media in differing forms, such as floppy disks, compact discs, tapes, or other removable storage media.

Problems frequently arise when a technician tries to search or locate specific backup media pertaining to specific customer premise equipment. Searching an archive of differing media among hundreds or thousands of networking components becomes a frustrating and resource-intensive task for the technician. This time-consuming process occasionally results in media being lost, damaged, or inadvertently left unsecure at the equipment. Alternatively, backup media may sometimes need to be mailed to a designated location, thereby further exposing the data to potentially harmful handling and more. This adds additional confusion when trying to locate or retrieve a backup incident to the failure of a piece of equipment.

Facilitating backups of hundreds or thousands of customer premise components located and distributed throughout a country or city present significant logistical problems to companies. Therefore, a need exists for a backup utility application that can perform remote backup and restoration functions on a multitude of network components. The current state of the art could be improved by automating the backup functions and routines for all local and remote network devices using a designated software application that would be responsible for scheduling and maintaining data archives at one central facility. A need further exists for the ability to perform specific routines and procedures for each of a set of proprietary components and thereby allowing data to be retrieved and stored in one or more central location(s). A need also exists for utilizing system redundancy of the backup application to improve reliability of all the backed up information. Additionally, a further need exists to provide an application that manages and maintains backups for all the backup components (which consequently would reduce the frustration, costs, and time associated with performing on site, manual data backups). Lastly, the current state of the art could be improved by providing accountability and identification of backup files and data that is easy to obtain, readily accessible in a central storage location, and not dependent on static, removable-storage-medium devices.

SUMMARY OF THE INVENTION

The above needs are met and the state of the art advanced by the present invention, which allows data in remote devices such as CPE devices to be automatically backed up from a remote location. The present invention has several practical applications in the technological arts including enabling thousands of thousands of remote devices to be automatically backed up, eliminating the need for persons to physically travel to a device to backup the data in the device; managing and maintaining backups for all the backup components; and accounting for and identifying backup files.

In a first aspect, a computer-implemented method for backing up data stored in one or more network-communication devices is provided. The method includes spawning at least one processing thread; collecting one or more arguments from a system resource to develop an assignment schedule; respectively associating one or more semaphores with the at least one processing thread; wherein the semaphore(s) remain inactive until the assignment schedule activates the at least one processing thread for execution; and determining whether a termination state exists between the one or more arguments and the at least one processing thread.

In a second aspect, a computer-program product is provided for performing a method of executing backup and restore assignments associated with customer premise equipment over a communications network. The method includes monitoring a threshold limit from a first processing thread; determining whether the threshold limit prevents a second processing thread from executing; producing a schedule of assignments from a first data structure for creating a job queue; assigning a job to a worker thread, which acquires assignment duties from a second data structure; determining a unique identifier from the second data structure, wherein the unique identifier associates the job with a network component; performing a job assignment, wherein the worker executes the job assignment by routing data to a third data structure; and populating at least one data logging structure to determine a status of the job assignment.

In a final illustrative aspect, a computer-implemented method is provided for performing backup and restoration functionality within a communications network. The method includes periodically referencing a first data structure to determine a scheduled assignment from one or more network components; temporarily storing the scheduled assignment in a job queue; retrieving the at least one scheduled assignment within the job queue by a worker thread, wherein the worker thread utilizes the at least one scheduled assignment extracting information from a second data structure; retrieving backup files from the one or more network components, wherein the one or more backup files is stored in a third data structure; and performing an informational trap based on the backup, wherein the informational trap communicates to a network manager.

BRIEF DESCRIPTION OF THE SEVERAL VIEWS OF THE DRAWINGS

The present invention is set forth with particularity in the claims below. Exemplary embodiments may be better understood by reference to the following description with reference to the attached drawing figures, which are incorporated in their entirety by reference herein and wherein:

DETAILED DESCRIPTION OF THE INVENTION

The present invention provides a method and system for performing system configuration backups, data-backups, and restore functions on customer premise equipment in a communications network where the device(s) being backed up are located in a geographic area distinct from where the backup data is to be stored.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, gateways, workstations, and other machines may be coupled to one another across a communication medium including, for example, a network or networks.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various technical terms are used throughout this description. A definition of such terms can be found in Newton's Telecom Dictionary by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, gateways, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM; flash memory or other memory technology; CD-ROM; digital versatile discs (DVD); holographic media or other optical disc storage; magnetic cassettes; magnetic tape; magnetic disk storage; and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media. What follows is a description of one or more preferred embodiments. The present invention is not limited to the following explanations.

Figure 1:
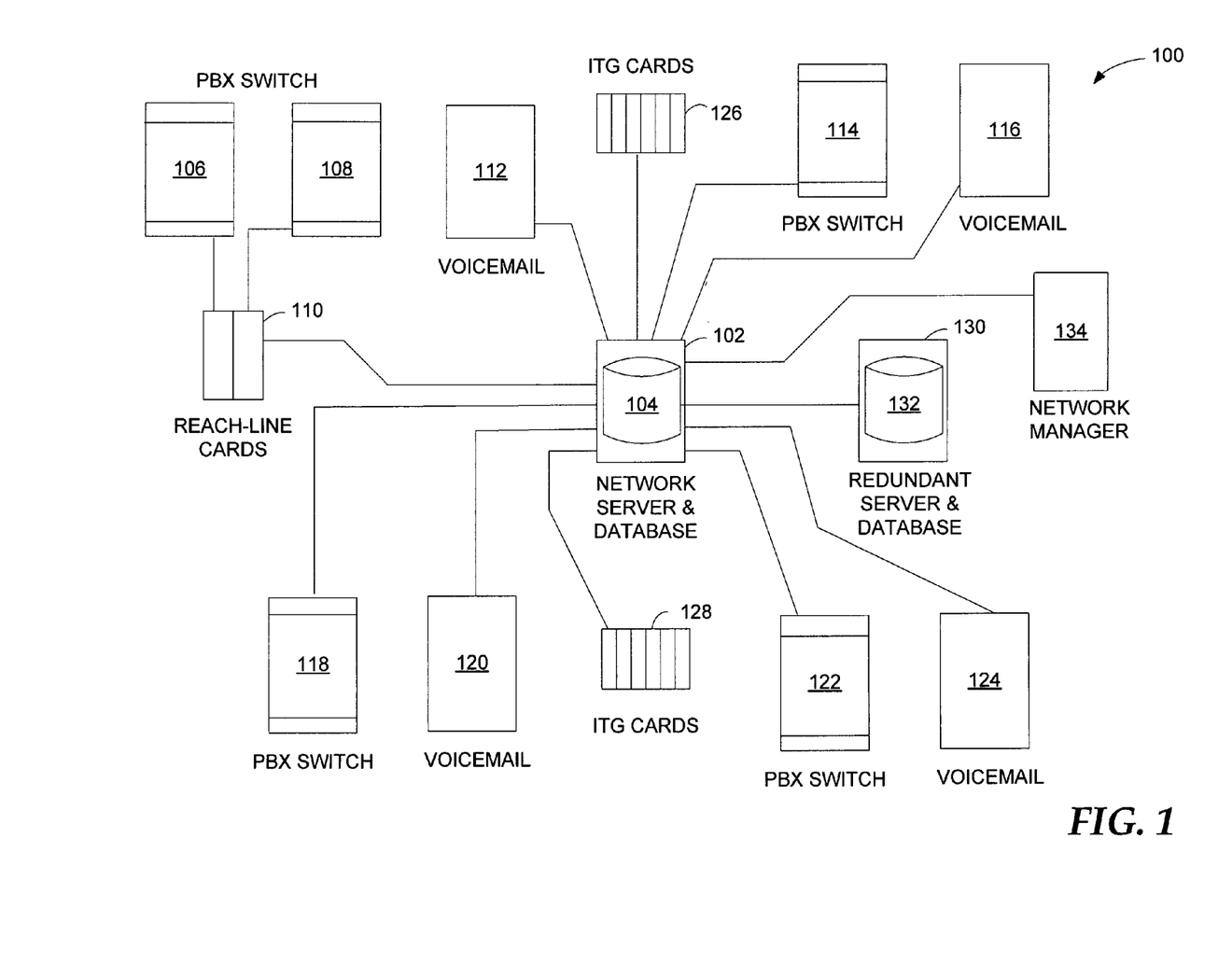
FIG. 1 is a block diagram illustrating an exemplary architecture in accordance with an embodiment of the present invention.

Turning now to FIG. 1, a block diagram illustrating an exemplary architecture in accordance with an embodiment of the present invention is provided and referenced generally by the numeral 100. Each aspect depicted in FIG. 1 will be explained in detail below. The reference numerals in FIG. 1 are numbered to correspond to the figures that discuss the various elements in greater detail. The immediately following comments are introductory in nature and intended to help provide a high-level overview of certain aspects of the present invention. Because of the high level of abstraction depicted in FIG. 1, it should not be construed as limiting in nature. That is, the elements, relationships, and flows of FIG. 1 are illustrative in nature and should not be construed as limitations of the present invention.

Network system 100 includes a network server 102, which preferably includes a database 104. Coupled to network server 102 is a number of customer premise equipment (CPE) devices. The CPE devices are coupled to network server 102 and database 104. In a preferred embodiment, network system 100 illustrates a network architecture that allows network server 102 to be located remotely from customer premises. For example, a public exchange (PBX) switch 106 and 108 may be located together in a geographic location remote from PBX Switch 114. Network 100 may employ hundreds, or even thousands, of network components located within a city, country, or beyond. Exemplary network components include public exchange switches, signal-transfer points, routers, repeaters, voicemail equipment, reach-line cards, inter-trunk gateway cards, and other subcomponents.

CPE devices include at least network hardware components located away from the communication provider's facility and are installed on the customer's business facility or other customer site. CPE devices are used to process various types of data, voice, and video communications across a local or national enterprise associated with the customer's communication needs. CPE devices are preferably administered and monitored by the communications provider and are coupled to a provider's central-processing facility.

CPE devices may include a variety of network components. Only a few of the components will be discussed herein so as to not obscure the present invention, but rather to better understand the nature of the present invention.

With continued reference to FIG. 1, reach-line cards 110 help establish a connection between two or more PBX switches 106 and 108 to expand the switching needs at an illustrative customer's location. Reach-line cards 110 contain memory features that allow a technician to program the cards for linking switches together. Further, it is often necessary for a provider to add or reconfigure reach-line cards from time to time to facilitate the expansion of a customer's network. The present invention is not limited to any particular type of reach-line card currently in existence.

Another component of CPE devices that requires frequent upgrades and backups of system configuration and storage data is a voicemail system, such as voicemail system 112. Voicemail system 112 illustrates a component coupled to network server 102. Voicemail system 112 contains configuration settings and data stored within a memory medium. Occasional upgrades and frequent backups of data within the voicemail system are standard tasks involved with administering the voicemail system.

Inter-trunk gateway cards 126 and 128 (referred to hereafter as an "ITG card") is a further illustrative CPE device that can be configured and more. ITG cards 126 and 128 provide interconnections with outside networks, allowing secure restriction from unauthorized users outside the network.

According to an illustrative embodiment of the invention, PBX switch 114 and voicemail system 116 are shown coupled to primary server 102 and database 104, which may be located in a geographically different part of a city, country, or other area distant from the customer's premises. As an example, PBX switch 114 and voicemail system 116 may be located in the northeast region of a country or city, with primary server 102 and database 104 located in a central or midwest region of the country or city. PBX switch 122 and voicemail system 124 may be located in a southeast region of the country or city, with primary server 102 and database 104, again, located in the central or midwest region of the country or city. PBX switch 118 and voicemail system 120 may be located in the southwest region of a country or city, with primary server 102 and database 104 located in a central region of the country or city.

To further illustrate the remote geographical context of the invention, primary server 102 may be in a location different from that of database 104. For example, primary server 102 may be located in a city such as Kansas City, with a network connection to database 104 remotely located within a data center located in Chicago. The scope of the present invention is not limited to primary server 102 and database 104 being contained within the same location, but is shown in FIG. 1 only as a simple illustration to easily understand and teach the invention. Thus server 102 could be located in a first city and backup data from a device in a second city to a storage medium in a third city.

Redundant server 130 and database 132 provide redundancy by maintaining backups of primary server 102 and database 104. In the event memory corruption or hardware issues occur with primary server 102 or database 104, backup information located within redundant server 130 and database 132 allows a technician to retrieve backup information from redundant server 130 and database 132. Redundant server 130 and database 132 may be disjoined and located in separate remote locations as previously mentioned with the aforementioned primary server 102 and database 104.

Network manager 134 provides a connection to primary server 102 and database 104 to monitor informational success and failure traps that occur during a backup procedure of CPE devices. Network manager 134 provides surveillance to the network in the event a backup or restore is not properly made from primary server 102. Network manager 134 communicates to primary server 102 over an SNMP communications protocol. In this invention, an SNMP protocol is discussed but not limited to this particular protocol within the present invention. Other communication protocols may be used to provide secure system management across a network as is common knowledge to one skilled in the art.

Figure 2:
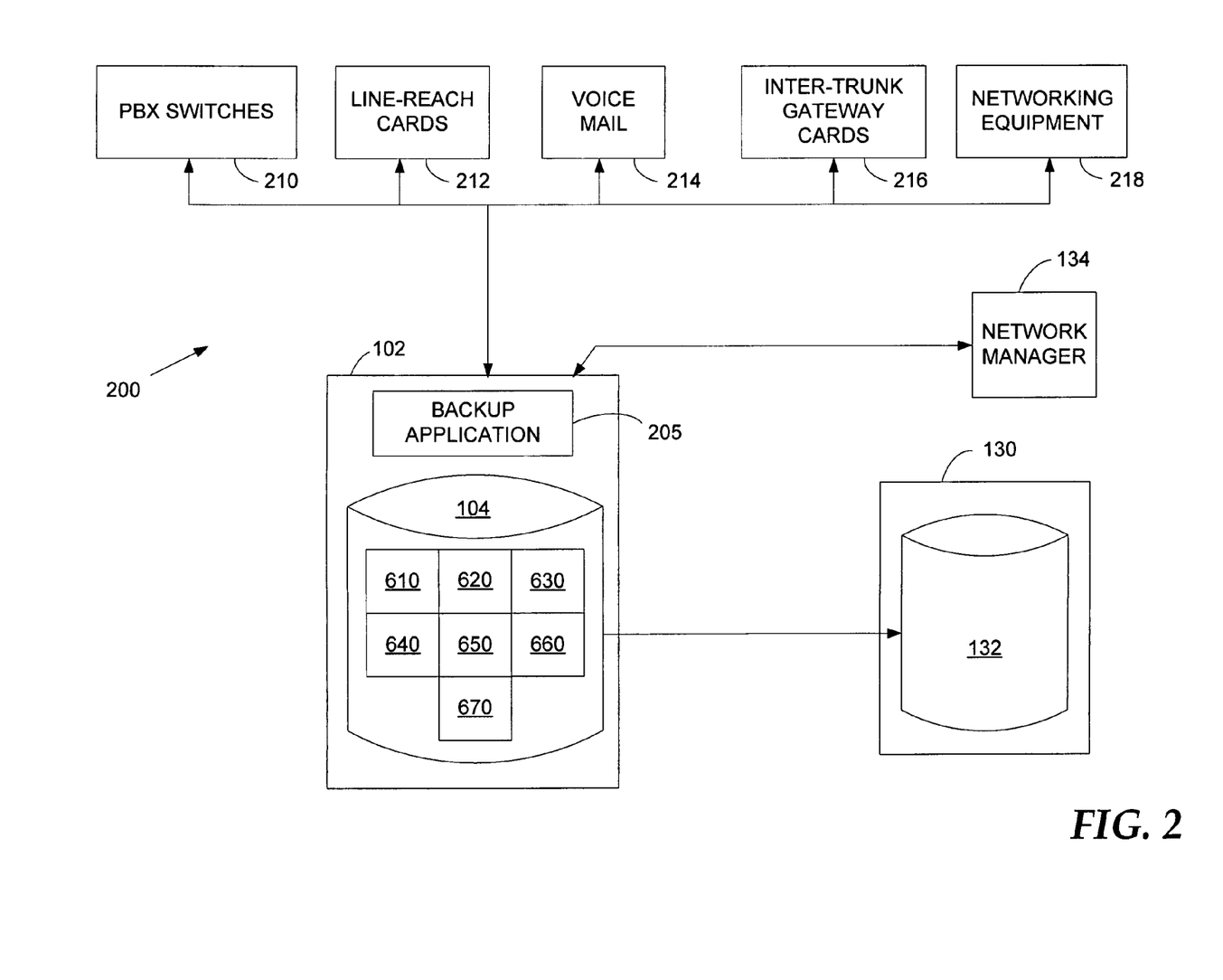
FIG. 2 is a block diagram depicting illustrative tables within a database in accordance with an embodiment of the present invention.

Referring now to FIG. 2, network system 200 is shown illustrating a greater level of detail to that of FIG. 1. Primary server 102 is shown with backup application 205 and database 104. Within database 104, several relational tables 610, 620, 630, 640, 650, 660, and 670 are shown supporting the backup application and will be discussed in greater detail in an illustration below. To communicate with the CPE devices, primary server 102 connects to the CPE devices using a preferably secure communications channel, which may be a dedicated management link using at least one or more network protocols communicated over copper, optical, or wireless mediums. For simplicity's sake, only one set of CPE devices are shown.

As previously mentioned, exemplary CPE devices shown include PBX switches 210, reach-line cards 212, voicemail device(s) 214, inter-trunk gateway cards 216, and other network equipment devices 218. Network system 200 shows primary server 102 and database 104 communicating with public exchange switches 210, reach-line cards 212, voicemail system 214, ITG cards 216, and other networking equipment 218. Networking equipment 218 may consist of other network switches, routers and networking components associated with a telecommunications network. Network system 200 provides an illustrative view of the hardware and internal components of equipment that will later be discussed in further detail in other illustrations of the present invention.

The present invention provides, among other things, a method and system for backing up data from a vast number of CPE devices, which may include PBX switches, voicemail systems, ITG cards, reach-line cards, and other networking components. This allows the system to perform backup and restore procedures on customer premise equipment over a network using a remotely located backup application 205 running on a server or computer system 102. The communication of data across the network may be an insecure or secure communication connection using, for example, a data management link or VPN connection, which prevents outsiders from tapping in or "hacking" critical data of network components, but the scope of the invention is not limited to any particular secure or insecure communications connection.

In the event that one or more CPE devices, such as, for example, a PBX switch is added or replaced at a customer's premise, a technician may easily restore configuration and memory settings from a remote location. This remote access feature of backup application 205 allows primary server 102 and database 104 to communicate with the PBX switch to initiate a restore or "active push" on the PBX switch, which assists the engineer/technician from manually having to configure the CPE device at the customer's premises.

Even though the figures present a single primary server 102 and database 104, a plurality of various servers and databases may be implemented to serve each city or geographic region, but for simplicity's sake, only one server 102 and database 104 is shown to better teach and understand the present invention.

Figure 3:
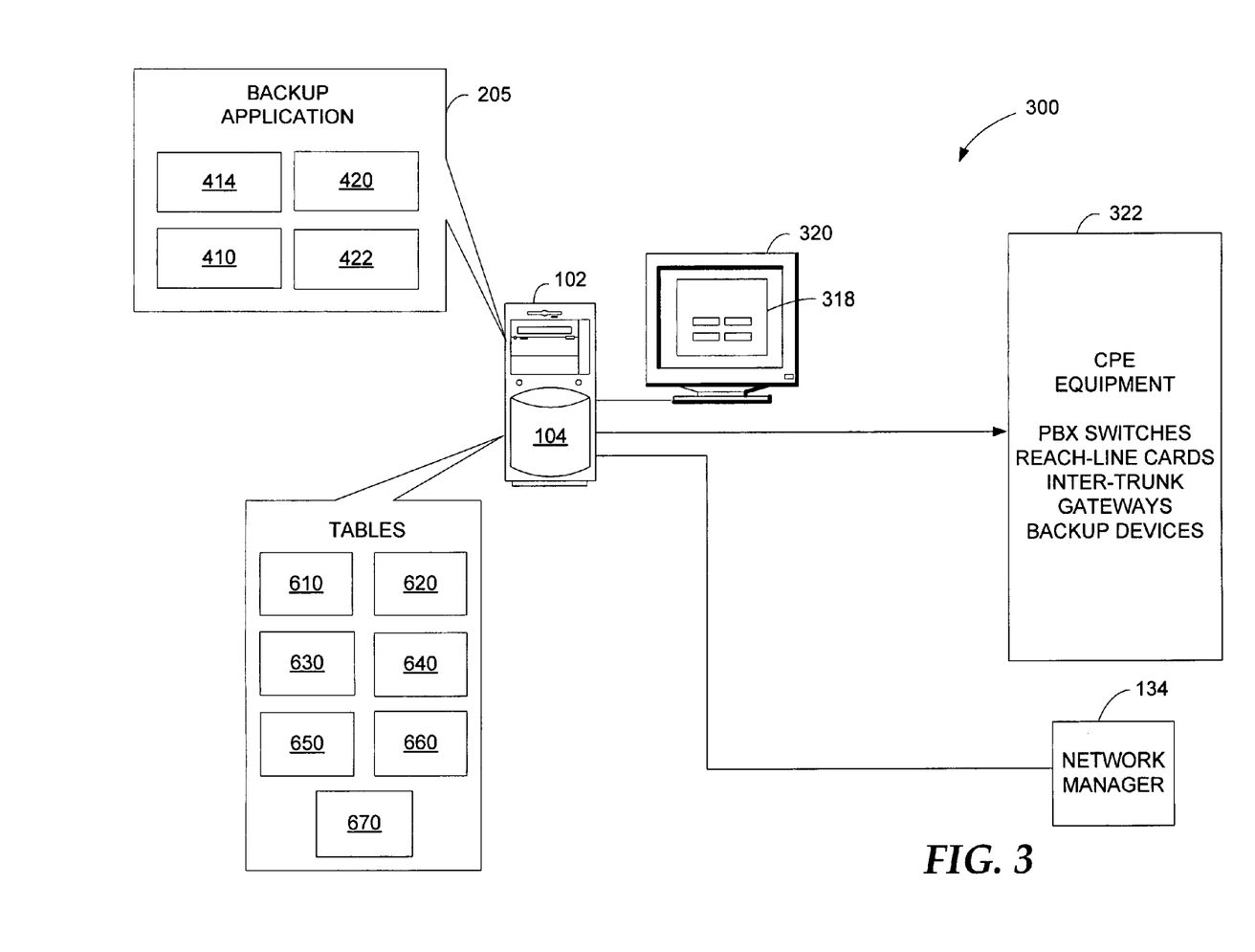
FIG. 3 is a network diagram depicting an exemplary network architecture in accordance with an embodiment of the present invention.

Turning now to FIG. 3, an exemplary network architecture is shown illustrating a more detailed example of the network system of the present invention. Network system 300 illustrates how backup application 205 resides within primary server 102. A graphical user interface 318 is shown for displaying backup application 205 on a computer monitor or terminal 320. Graphical user interface 318 illustrates how a user interacts with backup application 205 to establish threshold limits and the number of worker threads to be utilized. The graphical user interface may be an Internet site displaying the backup application on the Internet, or a separate executable software program that displays the backup application on computer monitor 320.

When the backup application 205 is initially started, either through an Internet connection or separate executable file for example, various threads are preferably implemented and shown: a trending thread 414, a foreman thread 420, a producer thread 410, and a worker thread 422. These threads help facilitate backups of data stored in CPE devices 322. Greater details and functionality on each of the threads will be provided below.

A metaphor is provided to help explain an embodiment of the present invention. Consider a manufacturing environment. A supply company provides distribution of its products to a client using truck, railroad, or airline-transportation systems for example. When a manufacturer or supplier produces a product, the product is packaged and received in a warehouse for distribution to various locations throughout the country. The manufacturer is responsible for producing the product and actually packaging or palletizing the product for scheduled deliveries to a specific destination. A foreman within the manufacturing facility supervises the schedule of deliveries for each of the palletized products and determines which product has to be distributed and shipped within a specific time frame. Besides knowing the shipment schedule, a foreman must also determine the capacity at which he can move the products to the various destinations using the various truck, railroad, or air-traffic systems. This is needed to determine which transportation system is preferred based upon the size of shipment and when the shipment needs to reach its final destination.

This chain of activity by the foreman for determining how much capacity and space is needed per shipment using truck, railroad, and air-traffic systems may be viewed as the amount of "bandwidth" available for getting products or shipments from point A to point B. If, for example, a truck is docked and waiting for an available load to be received, a worker will be tasked by the foreman to load specific scheduled products within the truck's trailer. Once the worker receives the assignment, it is the worker's duty to complete the job without any further intervention from the foreman until the scheduled product is completed and the worker returns for more work. If a foreman determines that no scheduled deliveries are available in the assignment queue for transporting cargo to a destination, workers requesting a new assignment by the foreman wait to determine if the foreman has any new assignments.

When a job is available for loading, the foreman notifies a worker that a job assignment is queued and available for loading. Once a worker receives the assignment, the shipment is loaded and delivered to the destination. Upon completion of the delivery, the worker determines if any of the goods or packages are damaged or missing during shipment. If any abnormalities were found, the worker acknowledges the deficiency and notifies the manufacturing facility. In this case, the worker would report the damaged goods or products to the distribution manager via some form of communication (telephone or other communication device), and notify the manager of the discrepancy in shipment. Upon completion of the shipment, the worker returns back to the manufacturing facility and checks with the foreman for another assignment.

The present invention provides functionality somewhat akin to that implicated in the aforementioned distribution system by utilizing application threads interacting with one another to perform system backups on CPE devices. A producer thread is used to generate and schedule backup assignments and places them within a job queue. A trending thread acts as a "watcher" responsible for monitoring and calculating the values of bandwidth and determining central processing unit (CPU) utilization for use by the producer and foreman threads. The trending thread retrieves the information from a network card or similar device and obtains CPU utilization from within an operating system associated with one or more computers of a computer system. Once calculated, the values are then available for use by the producer and foreman threads.

The foreman responds by checking the bandwidth and CPU utilization thresholds, and determines if the producer's job queue contains scheduled assignments. If assignments are available in the queue and bandwidth and CPU utilization thresholds are below user-defined limits, the foreman delegates an assignment to the worker thread. If the bandwidth and CPU utilization levels have exceeded the threshold limits, the foreman will indicate to the thread to pause. Once the bandwidth and CPU utilization levels are within the threshold limits, the foreman delegates an assignment to the worker thread.

Figure 4:
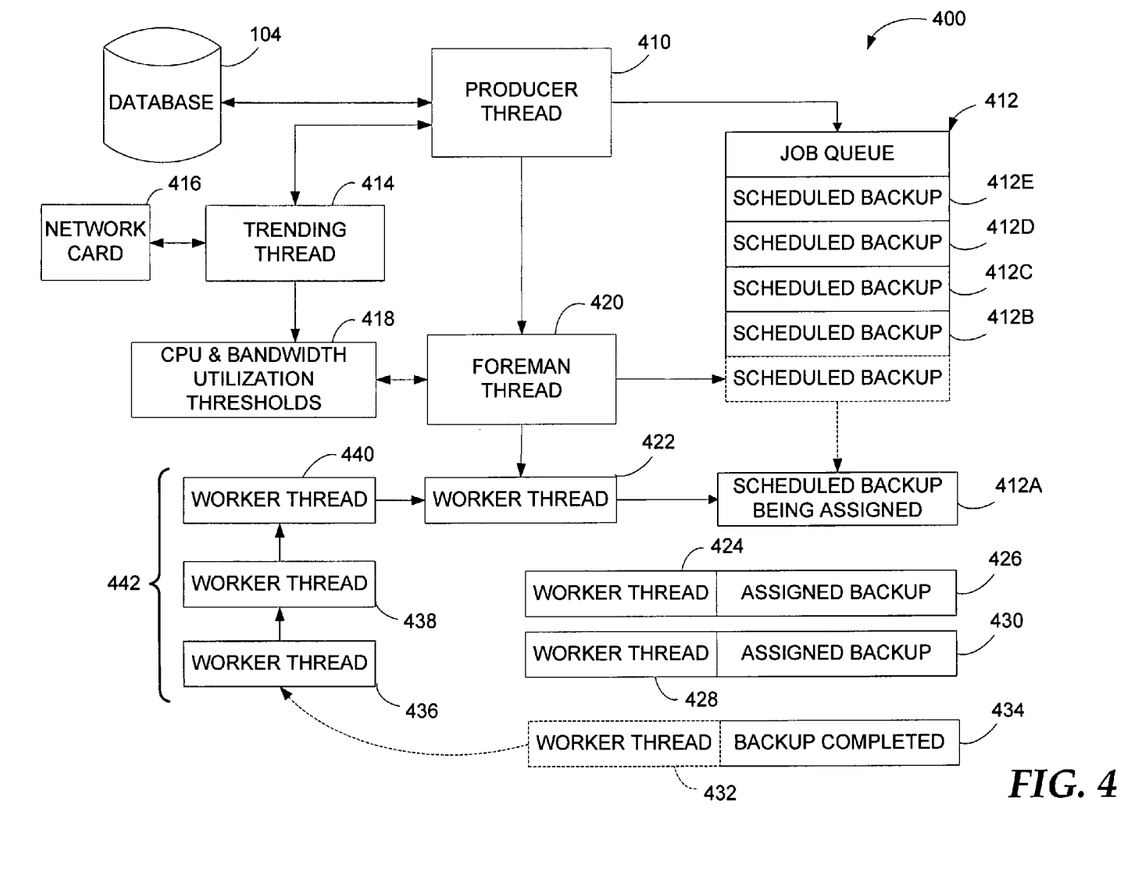
FIG. 4 is a block diagram illustrating an exemplary method for administering backup assignments using application threads in accordance with an embodiment of the present invention.

Referring now to FIG. 4, a block diagram 400 is shown illustrating the process of threads working together to perform scheduled backups. A producer thread 410 communicates to database 104 to establish one or more schedules for CPE device backups. Within database 104, producer thread 410 periodically references accounts table 610 for information needed for scheduling an assignment from each CPE device. Once the scheduled backups are created, each scheduled assignment is placed in job queue 412 as shown in 412A through 412E. In addition, producer thread 410 communicates with trending thread 414 when an assignment is determined. Trending thread 414 retrieves bandwidth information in octet format using a network card 416 that converts bandwidth values using a mathematical algorithm and stores them in a preferred format. Trending thread 414 retrieves CPU utilization from the operating system in a preferred embodiment.

Threshold limits for CPU utilization and bandwidth are established by a user when backup application 205 is initially started. Producer thread 410 notifies foreman thread 420 when a scheduled assignment has been queued. Prior to assigning any scheduled backups to worker thread 422, foreman thread 420 checks CPU utilization and bandwidth thresholds 418 to determine if current bandwidth and CPU utilization levels are within the threshold limits. If CPU utilization and bandwidth levels are within limits, foreman thread 420 checks job queue 412 for an available assignment and notifies worker thread 422 of scheduled backup 412A. Once notified by the foreman of the assignment, worker thread 422 becomes formally assigned to scheduled backup 412A located within job queue 412. Worker thread 422 reads the index number and timestamp of assigned backup 412A and communicates with file manifest table 630 (not shown in FIG. 4) located within database 104. Obtaining information from file manifest table 630 allows worker thread 422 to directly locate, communicate, and perform the assigned backup on the specific CPE device. Further details on how the tables interact within the database will be presented in a later discussion.

The present invention allows a user to establish the amount of worker threads the system will utilize to perform assignments. The present invention receives a selection indicating a number of worker threads to be established when the backup application is initially started. FIG. 4 illustrates (in exemplary fashion) six worker threads being used with two worker threads 424 and 428 currently performing an assigned backup. Worker thread 432 is shown completing an assigned backup. Once an assignment is completed 434, worker 432 performs a log and informational trap (not shown) notifying network manager 134 whether a failure or success has occurred, and then returns in line 442 to wait for another assignment from foreman thread 420.

In a communications network spread across a country with thousands of CPE devices, there may be one or a thousand worker threads performing backup assignments. If, for example, CPU utilization and bandwidth were increased by adding additional CPU hardware resources (adding processors, or performing parallel processing), or increasing network bandwidth, from say, a T-1 connection (1.544 Mbps signaling rate) to a DS-3 (44.763 Mbps signaling rate), the number of worker threads could be increased to expedite assignments within the queue.

A computer thread is an application process operating within computer code that allows a specific function to be performed. In the present invention, computer threads are implemented to perform the task of performing backup and/or restore procedures on customer premise equipment located either locally or remotely away from the CPE devices. The present invention allows computer threads to perform specific tasks independently but also to work in concert with one another.

Using multiple threads simultaneously allows the application to perform more efficiently when backing up customer premise equipment. For example, a trending thread primarily functions to monitor or "watch" CPU utilization and network bandwidth. For network bandwidth, trending thread converts the data packets delivered in octets into a format that allows other threads to operate as well. As an example, if 5,000 octets of data are captured at a specific moment from a network card, that would translate to 40,000 bits per second. A bandwidth may be used as a threshold limit to prevent the application from performing additional processes. Additionally, CPU utilization threshold limits would allow the backup application to process new assignments only if limits are below the maximum threshold. Threshold limits prevent the backup application from overloading system resources, which could render computer errors and cause exceeding time delays in the overall system.

Figure 5A:
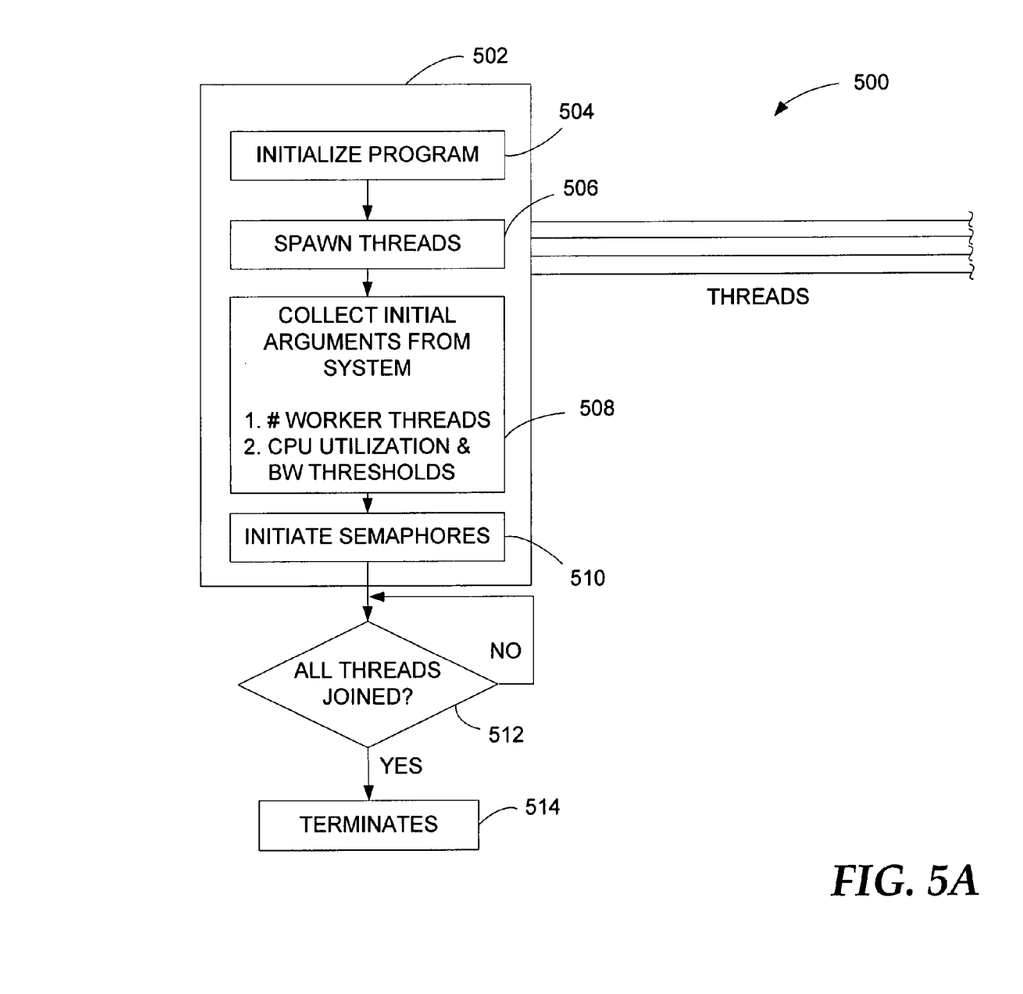
FIGS. 5A-5B are flow diagrams depicting an exemplary process for initializing and performing thread processes of backup assignments in accordance with an embodiment of the present invention.

Referring now to FIG. 5A, a flow diagram depicting an exemplary process in accordance with an embodiment of the present invention is provided and is referenced generally by the numeral 500. The diagram illustrates an initialization process of the backup application. An initialization stage 502 depicts how the backup application performs a startup when first initialized. The initialization process begins by initializing the program 504. The application then spawns system threads 506 by generating the threads for program operation within the application. Next, initial arguments are selected from system 508 to establish semaphores, the number of worker threads, and CPU utilization and bandwidth threshold values (percentages, bits/sec, etc.).

Semaphores establish a thread-count on the number of worker threads that have been assigned by the user. In addition, birth-locks are established to lockdown a worker thread to assist the producer thread in keeping track of which worker thread is being utilized, and it allows the worker threads to be created independently of the producers lifespan. Birth-locks are values stored in a thread-count variable within the backup application code, that decrements once a worker thread has been established an assignment. Utilizing semaphores and birth-locks allows the producer to finish its job before all the worker threads have completed their assignment and eliminates the possibility of the system crashing the program or causing collisions. Prior to any worker thread receiving an assignment, the foreman thread locks the worker thread, which reduces the positive number within the thread count by a one in one embodiment. This process of using birth-locks allows the system to know if all scheduled assignments have been completed.

Once initialization process 502 has been established, the application threads will begin working. During this process, the program will be continuously working until eventually, it determines if all thread-counts have been reduced to zero. If all the threads are joined 512, meaning the thread-count has been reduced to zero for example, the program terminates 514. If all the threads are not all joined and the thread count is greater than zero, then the process will continue to cycle until the thread-lock count has reduced to zero.

Figure 5B:
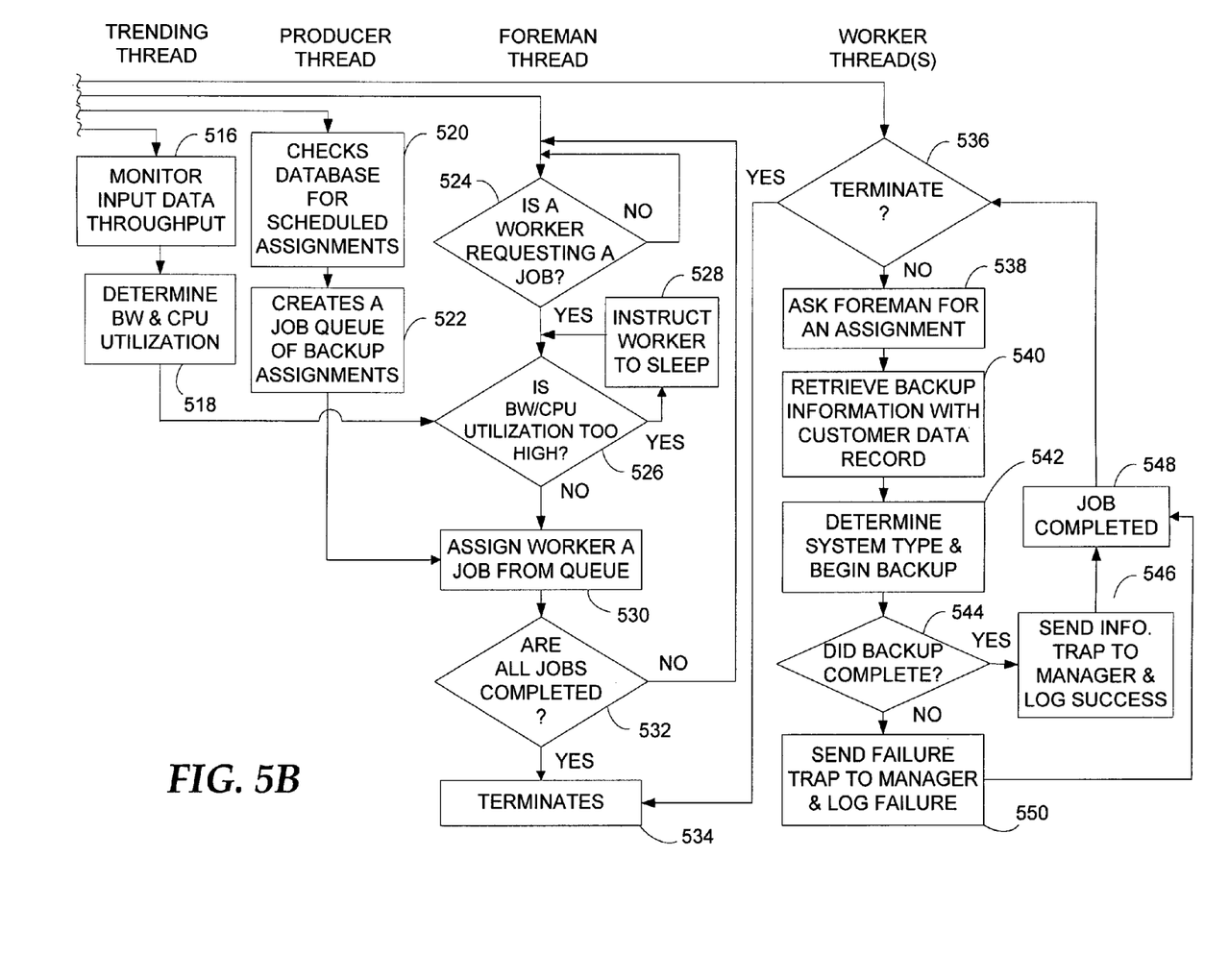

Turning now to FIG. 5B, a continuation of the thread processes shown in FIG. 5A is illustrated to depict the individual steps involved with each of the application threads. The trending thread monitors the input data throughput 516 of the network using a network interface card (not shown). During the monitoring process, the trending thread calculates the bandwidth value and retrieves the CPU utilization from an operating system of the computer or server system 518.

The producer thread begins by checking database 104 for scheduled assignments 520. Producer thread continues by creating a job queue of backup assignments 522 to allow the foreman thread to later permit a job assignment to be joined by a worker thread. A foreman thread checks to see if a worker thread is requesting a job 524. If no worker is requesting a job, the foreman continues to check and see if a worker thread is requesting a job. If a job is being requested from a worker thread, the foreman determines if CPU utilization and bandwidth levels have exceeded the predetermined threshold limits 526. If the levels are too high, the foreman thread instructs the worker thread to sleep for a recommended amount of time 528.

The worker revisits the foreman to see if an assignment is available. If the CPU utilization and bandwidth values are below a threshold, the foreman allows the worker thread to access an assignment from the queue 530. The foreman thread proceeds by checking to see if all jobs have completed 532. If the foreman determines assignments are still within the job queue, the foreman returns to check if a worker is requesting a job assignment 524. Once all the jobs have completed 532, the application terminates 534 in a preferred embodiment.

When a worker thread is initially started by the system, the first determining factor encountered is whether or not to terminate 536. If the worker thread is instructed not to terminate, worker thread asks the foreman for an assignment 538. If the foreman thread determines an assignment can be made, the worker thread retrieves the backup information having the customer data record 540. The worker thread proceeds by determining what system type, location, and network component to serve, and then begins the backup 542. Once the backup has completed, the worker thread determines if the backup completed successfully 544. If the backup completed successfully, the worker sends an informational trap to the management system and logs the success 546. If the backup did not complete successfully 544, the worker sends a failure trap to the system manager and logs the failure 550. Once the job is completed, worker thread returns to determine if it should terminate 536. If other worker threads have been assigned a job, and no additional assignments remain, the work thread terminates 534.

Figure 6A:
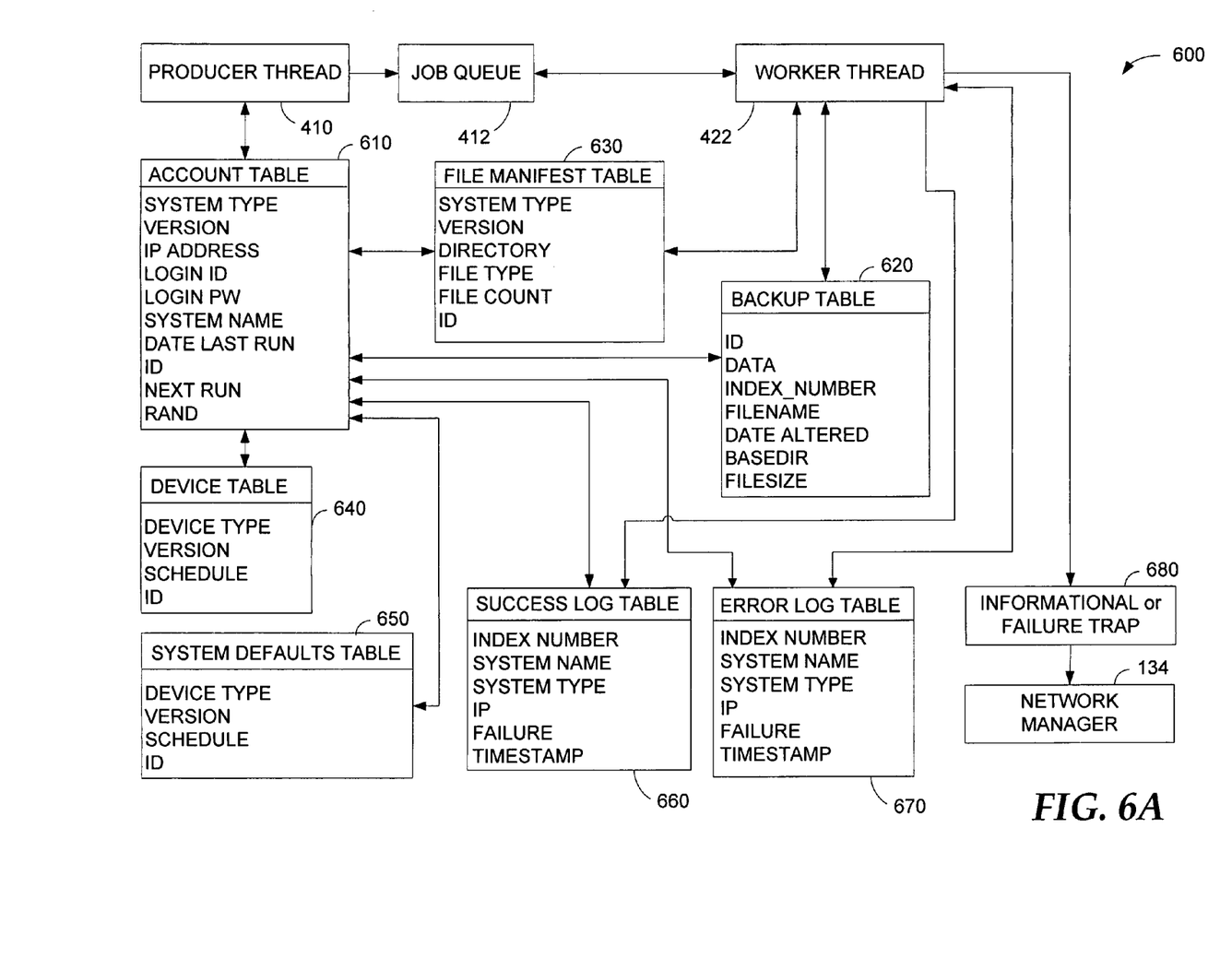
FIG. 6A is a flow diagram that provides a more detailed depiction of an illustrative portion of a database schema suitable for use in an embodiment of the present invention.

Referring now to FIG. 6A, an exemplary flow diagram is shown that provides a more detailed depiction of the illustrative portion of a database schema suitable for use within the embodiment of the present invention. Producer thread 410 queries account table 610 based on the next-run record to retrieve all records requiring a scheduled backup, and places the scheduled assignment into job queue 412 for later retrieval by worker thread 422. Account table 610 shares relational data and records directly with device table 640, system defaults table 650, and file manifest table 630. Once a worker thread 422 is permitted by the foreman thread (not shown in FIG. 6A) to begin an assignment, worker thread 422 retrieves the necessary data or "customer data records" from file manifest table 630 based on information retrieved from job queue 412. After retrieving the necessary information from file manifest table 630, worker thread 422 proceeds by determining the IP address within the scheduled assignment to locate the assigned network component or CPE device. Once the equipment is located, worker thread 422 performs the scheduled backup assignment.

In a preferred embodiment of the present invention, worker thread 422 writes the backed up data files to backup table 620 using a script, such as a Perl script, that serially transfers all backup files to a backup record within backup table 620. Familiar to one skilled in the art, the Perl programming language is employed to serialize files based on the nature of how files are written using the language. In addition, a handle acts as a nametag allowing data to be packed into one large "conglomeration" of data. Utilizing a specific database such as, for example, MySQL, a conglomeration data file can be stored within a record of the database accompanied by an assigned index or ID number representing the particular database record. Incident to reading the provided disclosure and figures, one skilled in the art would understand many different ways to implement or code the functionality described.

The entries in backup table 620 are logically tied to accounts table 610 by an identification (ID) record. Once worker thread 422, completes an assignment, worker thread 422 is responsible for entering a row into success log table 660 or error log table 670. Both success log table 660 and error log table 670 are related to accounts table by the index number record. Additionally, worker thread 422 sends an information and/or a failure trap 680 to network manager 134.

Figure 6B:
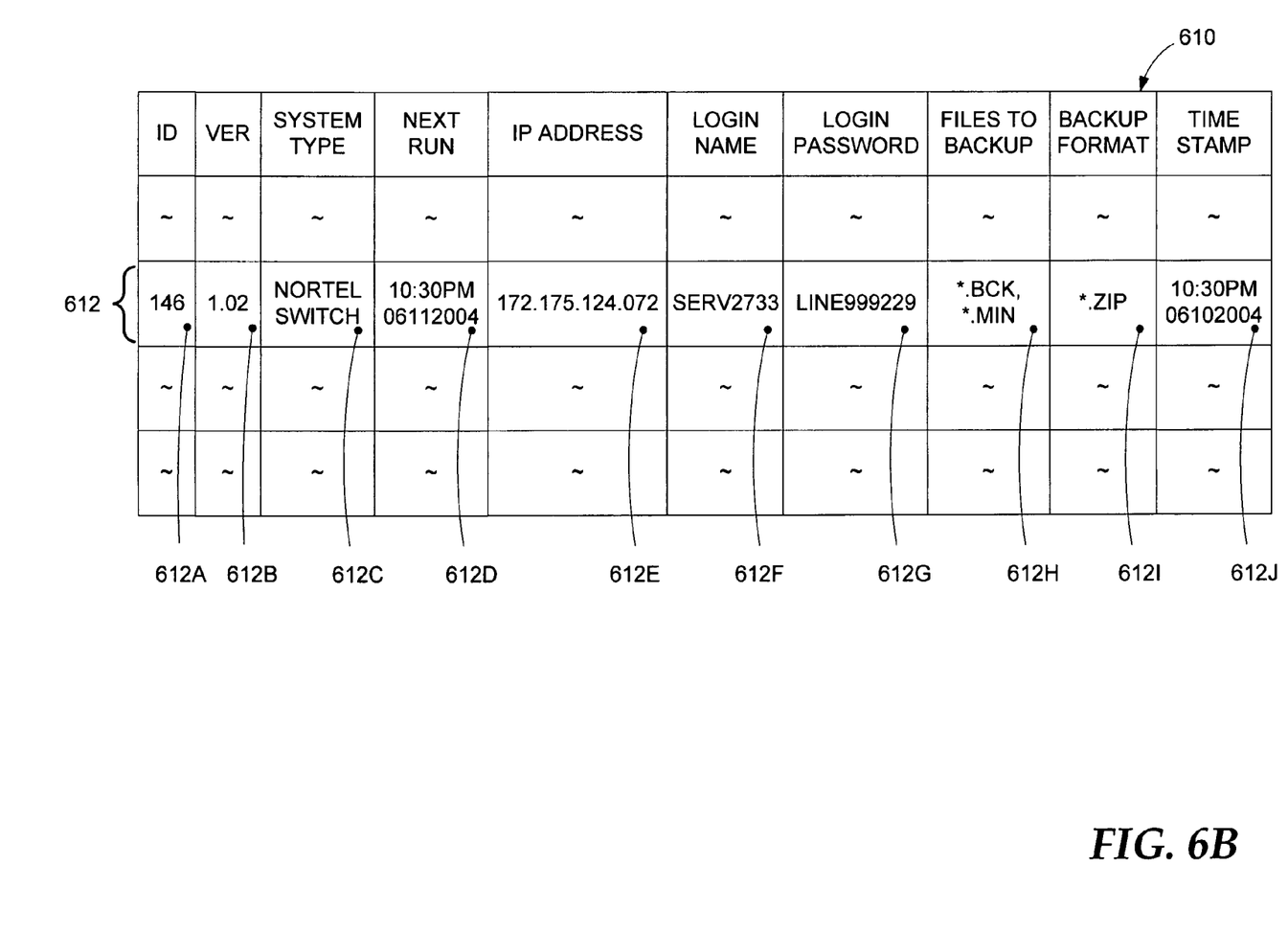
FIG. 6B is a relational data structure identifying some key fields in accordance with an embodiment of the present invention.

Turning now to FIG. 6B, account table 610 illustrates some common records and fields required for the producer thread to retrieve and perform an assignment within the present invention. As an example, only one row 612 is shown for a particular network component. In reality, hundreds or thousands of row entries would be used for all of the network components requiring backups. ID number 612A represents an identifier associated with a particular piece of equipment and would be used to reference a piece of backup equipment with one or more other relational tables, such as, for example, backup table 620, file manifest table 630, device table 640, and system defaults table 650. The hardware version shown in record 612B provides the latest version of the network component. The system type 612C is used to identify the system being used for the network component.

A next-run field preferably contains a record 612D having a time and date associated for performing the next scheduled backup. An IP address record 612E provides the network address location of the network component on the communications network. Login name 612F provides the backup equipment's login identifier to gain access within the particular network component. Login password 612G provides a security password needed to login into the network component's memory medium. Once the worker thread initiates these entries with the particular device over the communications network, the worker thread initiates a script to extract and download particular files or file extensions to be backed up 612H. Backup format record 612I may be used to compress the files into a single file that pertains to one or more different extension types. As an example, all the files may be compressed into a "zip" file, but the scope of the invention is not limited to any particular compression tool or extension, and other types of compression tools and file extensions could be used. If backup format 612I is left blank, all the files being backed up may be serially streamed into one large "conglomerate" file as previously mentioned using a Perl script. However, certain devices require different scenarios for backing up files. Some device files may be large files requiring compression to save space, while other equipment files may require less space eliminating the need for compression. Lastly, timestamp 612J provides a timestamp, which may be, for example, a time and date of the last completed backup performed on the device.

Many different arrangements of the various components depicted, as well as components not shown, are possible without departing from the spirit and scope of the present invention. Those skilled in the art will appreciate the litany of additional network components that can be used in connection with the present invention. The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention Certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. A computer-implemented method for backing up data stored in a customer-premise equipment (CPE) device, the CPE device being a telecommunications-networking device that facilitates telecommunications operations and that is physically located away from a carrier's facilities, the method comprising:

spawning at least one processing thread, wherein spawning at least one processing thread comprises:
initializing a trending thread for monitoring at least one system value;
initializing a producer thread for scheduling assignments;
initializing a foreman thread for delegating assignments; and
initializing at least one worker thread to perform a backup on a CPE device;
collecting one or more arguments from a system resource to develop an assignment schedule;
respectively associating one or more semaphores with the at least one processing thread; wherein the semaphore(s) remain inactive until the assignment schedule activates the at least one processing thread for execution; and
at a backup-storage location, facilitating a backing up of data stored on the CPE device by executing said at least one processing thread, wherein said CPE device is located in a geographic area that is distinct from the backup-storage location and wherein further the data stored are configuration parameters of said CPE device that enable it to facilitate at least a portion of the telecommunications operations, such that if said configuration parameters in said CPE device become corrupted, then said stored data can be utilized to correct the corrupted parameters.

2. The method of claim 1, wherein the at least one system value includes at least one of:
a network-bandwidth value; and
a CPU-utilization value.

3. The method of claim 1, wherein collecting one or more arguments comprises:
requesting a value for determining one or more working threads; and
requesting at least one threshold limit of the at least one system value.

4. The method of claim 1, further comprising determining whether a termination state exists between the one or more arguments and the at least one processing thread.

5. One or more computer-storage media having computer-useable instructions embodied thereon for performing a method of executing backup and restore assignments associated with customer premise equipment over a communications network, the method comprising:
monitoring at least one threshold limit associated with a first processing thread;
determining whether the at least one threshold limit prevents a second processing thread from executing;
producing a schedule of assignments from a first data structure for creating a job queue;
assigning a job to a worker thread, wherein the worker thread acquires one or more assignment duties from a second data structure;
determining a unique identifier from the second data structure, wherein the unique identifier associates the job with customer premise equipment logically coupled within said communications network, wherein the customer premise equipment facilitates telecommunications operations between two or more other devices;
performing a job assignment, wherein the worker thread executes the job assignment by routing data associated with customer premise equipment configuration to a third data structure; and
populating at least one data logging structure to determine a status of the job assignment.

6. The media of claim 5, wherein monitoring at least one threshold limit comprises:
    receiving a bandwidth value of a network medium; and
    obtaining a CPU utilization value, wherein obtaining said CPU utilization value includes obtaining said utilization value from an operating system.

7. The media of 6, wherein the data routed to the third data structure duplicates a set of data stored on the customer premise equipment associated with the job.

8. The media of claim 6, wherein the first data structure is a relational database table.

9. The media of claim 8, wherein the unique identifier is an integer number.

10. The media of claim 9, wherein the second data structure is a relational database table.

11. The media of claim 10, wherein routing data to a third data structure comprises:
    receiving one or more data files associated with a piece of network equipment that enables operation of the communications network;
    saving the one or more data files into a conglomeration data file into a data field;
    referencing the third data structure with the second data structure using an index number; and
    referencing the second data structure with the first data structure using the index number.

12. The media of claim 11, wherein the third data structure is a relational database table.

13. The media of claim 12, wherein the at least one data logging structure is a relational database table.

14. A computer-implemented method for performing backup and restoration of network equipment data files within a communications network, comprising:
    periodically referencing a first data structure to determine at least one scheduled assignment from one or more pieces of network equipment that contain data files associated with configuring communication pathways through the network;
    wherein periodically referencing the first data structure to determine at least one scheduled assignment comprises:
        determining a timestamp associated with the at least one scheduled assignment,
        determining a location of the piece of network equipment, retrieving login identifiers associated with the piece of network equipment,
        obtaining one or more file types of the piece of network equipment, and
        determining a backup format for storing the one or more file types;
    temporarily storing the at least one scheduled assignment in a job queue;
    retrieving the at least one scheduled assignment within the job queue by a worker thread, wherein the worker thread utilizes the at least one scheduled assignment extracting information from a second data structure;
    retrieving one or more backup files from the one or more pieces of network equipment, wherein the one or more backup files is stored in a third data structure; and
    communicating information associated with the backup to a network-manager component.

15. The method of claim 14, wherein the first data structure is a relational data base table.

16. The method of claim 15, wherein extracting information from a second data structure comprises:
    retrieving one or more equipment identifiers related to the piece of network equipment; and
    obtaining one or more computer scripts for performing the backup.

17. The method of claim 16, wherein the third data structure is a relational-database table.

18. A computer-implemented method for managing data stored in a plurality of network devices of a communications network, comprising:
    providing for the identification of one or more of said plurality of network devices that contain data to be backed up, wherein said plurality of network devices enable logical connections between two or more other devices, other than one or more of said plurality of network devices, within the network;
    establishing a logical connection with said one or more of said plurality of network devices;
    initializing a plurality of processing threads to effect said managing data, wherein at least one processing thread of said plurality of processing threads includes, a trending thread for monitoring at least one system value, a producer thread for scheduling assignments, a foreman thread for delegating assignments, and at least one worker thread to perform a backup on a network device; and
    at a backup-storage location, facilitating a backing up of data stored on said one or more of said plurality of network devices by executing said at least one processing thread, wherein said one or more of said plurality of network devices are located in a geographic area that is distinct from the backup-storage location.

* * * * *